United States Patent
Jakus et al.

(10) Patent No.: US 8,726,588 B2
(45) Date of Patent: May 20, 2014

(54) REINFORCED COMPOSITE MATERIAL EXPLOSION VENT

(75) Inventors: Guy Jakus, Zemst (BE); Tom Eijkelenberg, Westerlo (BE)

(73) Assignee: Fike Corporation, Blue Springs, MO (US)

(*) Notice: Subject to any disclaimer, the term of this patent is extended or adjusted under 35 U.S.C. 154(b) by 1161 days.

(21) Appl. No.: 11/389,455

(22) Filed: Mar. 24, 2006

(65) Prior Publication Data

US 2007/0234655 A1  Oct. 11, 2007

(51) Int. Cl.
*E04B 1/00* (2006.01)

(52) U.S. Cl.
USPC .............. 52/203; 52/99; 52/100; 220/89.2

(58) Field of Classification Search
USPC ......... 52/1, 98–100, 202, 209; 220/89.1, 89.2
See application file for complete search history.

(56) References Cited

U.S. PATENT DOCUMENTS

| | | | |
|---|---|---|---|
| 2,358,143 A * | 9/1944 | Castor | 52/100 |
| 2,721,157 A * | 10/1955 | Martin et al. | 52/208 |
| 4,067,154 A * | 1/1978 | Fike, Jr. | 52/99 |
| 4,207,913 A * | 6/1980 | Fike, Jr. | 137/68.23 |
| 4,498,261 A | 2/1985 | Wilson et al. | |
| 4,612,739 A | 9/1986 | Wilson | |
| 4,662,126 A | 5/1987 | Malcolm | |
| 4,748,790 A * | 6/1988 | Frangolacci | 52/794.1 |
| 4,787,180 A | 11/1988 | Robinson et al. | |
| 4,821,909 A * | 4/1989 | Hibler et al. | 220/203.08 |
| 5,022,424 A | 6/1991 | Reynolds et al. | |
| 5,036,632 A | 8/1991 | Short, III et al. | |
| 5,269,436 A * | 12/1993 | Bachmann | 220/62.2 |
| D373,984 S * | 9/1996 | Darien | D12/400 |
| 5,967,170 A * | 10/1999 | Hume et al. | 137/68.27 |
| 6,070,365 A | 6/2000 | Leonard | |
| 6,112,931 A * | 9/2000 | Booth et al. | 220/88.1 |
| 6,607,003 B1 * | 8/2003 | Wilson | 137/68.23 |
| 6,792,964 B2 * | 9/2004 | Farwell et al. | 137/68.25 |
| 6,959,828 B2 * | 11/2005 | Eijkelenberg et al. | 220/89.2 |
| 7,017,767 B2 * | 3/2006 | Eijkelenberg et al. | 220/89.2 |
| 7,234,278 B2 * | 6/2007 | Eijkelenberg et al. | 52/99 |
| 7,306,693 B2 * | 12/2007 | Weatherby et al. | 156/293 |
| 2005/0103785 A1 | 5/2005 | Eijkelenberg et al. | |
| 2005/0103786 A1 | 5/2005 | Eijkelenberg et al. | |
| 2006/0076350 A1 * | 4/2006 | Weerth | 220/88.1 |
| 2006/0131307 A1 * | 6/2006 | Eijkelenberg et al. | 220/89.2 |
| 2007/0029321 A1 * | 2/2007 | Palley | 220/88.1 |
| 2008/0041454 A1 * | 2/2008 | Eijkelenberg et al. | 137/68.23 |

* cited by examiner

*Primary Examiner* — Elizabeth A Plummer
(74) *Attorney, Agent, or Firm* — Hovey Williams LLP

(57) ABSTRACT

A non-metallic explosion vent is provided for protecting a confined space from a high overpressure condition. Reinforcing material having greater tensile strength than the resin, such as glass fiber roving, mesh or fabric, is embedded in the panel. An elongated, overall U-shaped groove extends inwardly from one of the surfaces of the panel through only a portion of the thickness of the panel. The groove interrupts the reinforcing material and defines a line of weakness that presents a relief area of the panel that opens under a predetermined overpressure condition. A plurality of spaced reinforcing components preferably overlie the groove, and optionally may extend across the relief area of the panel, transversely thereof and at an angle to one another. The reinforcing components contribute to control of the burst pressure of the vent and assist in preventing separation of the vent area from the body of the panel and/or fragmentation of the vent area during opening thereof.

44 Claims, 2 Drawing Sheets

REINFORCED COMPOSITE MATERIAL EXPLOSION VENT

BACKGROUND OF THE INVENTION

1. Field of the Invention

A relatively high strain to failure composite explosion vent having ductile fracture behavior is provided for protecting a confined space from a high overpressure condition vent is especially adapted to cover relief openings in enclosures subject to rapid pressure build-ups that result from explosions or uncontrolled fires in a variety of structures and vessels including buildings, bag houses, tanks, grain silos, equipment, the duct work leading to the bag houses or to or from such equipment, and other structures subject to hazardous high overpressure events.

The vent includes an inner panel of thermoplastic synthetic resin reinforced with material that has a greater tensile strength than the resin. The reinforcing material preferably comprises woven glass fibers, plus optional random glass fibers. The panel has an elongated continuous groove that extends completely through or through only a portion of the thickness of the panel. Alternately, a series of individual end-to-end slots may be provided, each of which extends entirely through the panel or through only a portion of the panel. The groove or slots interrupt at least a part of the reinforcing material to define a line of weakness that presents a respective central relief area of the vent that opens under a high overpressure condition. Relatively thin cover sheets are provided on opposite sides of the central panel to enhance the fluid impermeability of the vent, permit use of the vent in applications that require sanitary components or equipment, and that function to provide relatively smooth opposed surface finishes for the vent. The groove or slots may be at least partially or completely filled with a synthetic resin material. Alternatively, an elongated object such as a steel wire may be embedded in the panel of a configuration defining the central relief opening in the vent that gives way and opens under a predetermined overpressure force.

The panel section of the vent may also be provided with elongated reinforcing components comprising glass fiber roving overlying the groove or certain of the line of weakness-defining slots. The reinforcing glass roving preferably extends across the full extent of the pressure relief area of the panel. The amount of overpressure required to open the relief area of the panel can be controlled by varying the number, configuration, glass composition, and relative orientation of the reinforcing components.

2. Description of the Prior Art

Explosion vents traditionally have been provided with a rupturable sheet of metal that has score lines or interrupted slits that define a line of weakness presenting the relief area of the vent. The amount of overpressure required to open the relief area of the vent is determined by, among other things, the shape of the line of weakness, the nature of the line of weakness, and the location of the line of weakness in the overall area of the vent.

An exemplary explosion vent is shown and described in U.S. Pat. No. 6,070,365, wherein a rectangular pressure relief panel is mounted in a frame adapted to be secured across a pressure relief opening. The unitary relief panel is formed from a single sheet of steel, stainless steel, Inconel, or other similar metal, and has a three-sided line of weakness defined by a plurality of interrupted slits. A series of spaced rupture tabs are often positioned over the line of weakness as shown in the '365 patent, that must rupture before the relief area of the panel gives away under a predetermined high overpressure resulting from an explosion or a fast-burning fire.

U.S. Pat. No. 5,036,632 is another example of a conventional rectangular metal sheet explosion vent that has a three-sided line of weakness defined by interrupted slits. Rupturable tabs are also provided in the vent of the '632 patent that must break before the central section of the panel ruptures along the slit line to relieve an overpressure. Elastomeric sealing gaskets may be provided around the periphery of the rupturable metal sheet.

U.S. Pat. No. 4,498,261, referred to in the disclosure of the '632 patent, is a rectangular vent panel that opens under a relatively low pressure in which the thin sheet structure is described as being medium impact polystyrene, a relatively soft metal such as aluminum alloy, or a fully annealed stainless steel. Interrupted X-pattern slits extend through the vent panel and define individual lines of weakness that terminate at the apex of the X. A thin sealing membrane having the same area as the rupture panel is adhesively bonded to the rupture panel, and may be formed of polyethylene, stainless steel, or aluminum. Similar structure is shown and described in U.S. Pat. No. 4,612,739.

SUMMARY OF THE INVENTION

The present invention relates to a non-metallic, non-fragmenting explosion vent for protecting a confined space from a high overpressure condition and that includes a composite panel of a synthetic resin such as polypropylene that is reinforced with material having a greater tensile strength than the resin. The preferred reinforcing material is glass fibers, which may be in the form of roving, woven glass mesh fabric, or random glass fibers. The panel is provided with a groove that extends transversely through the panel or through only a portion of the thickness of the panel. The groove or slots interrupt the reinforcing material to define the line of weakness that presents a relief area of the panel that opens under a predetermined overpressure thereagainst, which, for example, may be from about 25 mbar to about 200 mbar.

In one embodiment of the invention, the vent is constructed of two panel members of synthetic resin material, such as polypropylene, positioned in overlying relationship with respect to one another. Each of the panel members is reinforced with glass fibers. After forming of aligned grooves or slots, in one or both of the panels by mechanical abrasion, synthetic resin material is introduced into the grooves or slots, or a steel wire is placed in the continuous groove line of weakness, and the panels are then placed in a heated press. Thin cover sheets are provided in overlying relationship to opposite sides of the laminar unit. Sufficient pressure and heat are applied to the panel members to cause the synthetic resin of the panel members to flow, thus forming, with the cover sheets, a composite vent. The heat softened resin preferably fills in the groove around the wire when used, or causes additional resin placed in the groove to substantially fill that groove.

A plurality of spaced, elongated reinforcing components may be provided on one or both opposed surfaces of the composite vent with each of the components overlying the groove or slots. The reinforcing components may either be short lengths of glass roving in a synthetic resin carrier therefor, or the components may be longer lengths of glass roving that extend substantially the full width and length of the composite vent and thereby across the relief area. Preferably, at least two of the longer lengths of glass roving extend across the full width and/or height of the vent. Alternatively, two or more additional glass roving reinforcing components may be provided on the composite vent that are at an acute angle with respect to one another and relative to the glass reinforcing components that are perpendicular to one another across and up and down of the vent.

The groove in the panel or panels may be of various transverse configurations, including, for example, U-shaped, T-shaped, generally V-shaped, and circular. A steel, transversely circular rod may be provided in the elongated line of weakness-defining groove in disposition in generally-conforming relationship to the groove. Preferably, non-wire containing grooves of the various configurations are each filled with a composition such as a synthetic resin.

DETAILED DESCRIPTION OF THE PREFERRED EMBODIMENT

Figure 1:
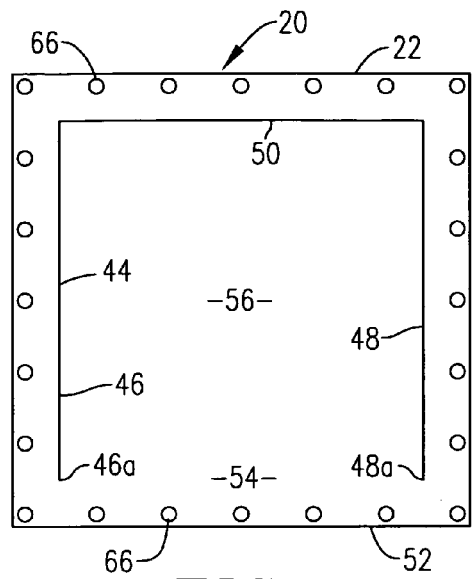
FIG. 1 is a plan view of one embodiment of the invention illustrating a non-metallic explosion vent in which a central, main composite vent panel is provided with a relatively narrow line of weakness-defining groove therein that is of generally U-shaped overall configuration.
Figure 9:
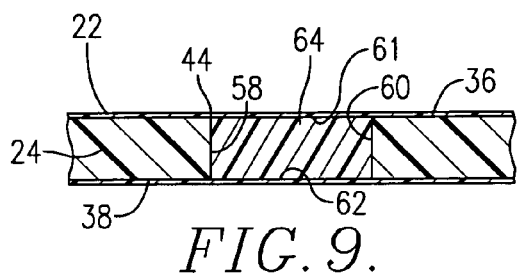
FIG. 9 is an enlarged, transverse cross-sectional view of the main composite panel illustrating another shape of groove in the panel.
Figure 6:
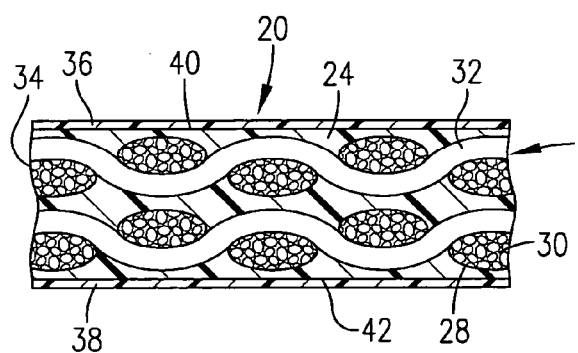
FIG. 6 is an enlarged, fragmentary, generally schematic cross-sectional representation of an explosion vent having a central main composite panel as in FIG. 1, for example, in accordance with this invention.

One embodiment of a non-metallic vent in accordance with this invention is illustrated in FIGS. 1, 6, and 9 of the drawings and designated by the numeral 20. Vent 20 comprises a generally flat main composite panel 22 made up of a central interior body 24 of a synthetic resin such as polypropylene. The resin body 24 is reinforced with material broadly designated 26 having greater tensile strength than the resin of body 24. Material 26 is preferably made up of glass fiber rovings 28, each comprising a bundle of elongated strands 30 of glass fibers that cooperate with glass fiber rovings 32, each also comprising a bundle of elongated strands of glass fibers. The rovings 28 and 32 are interwoven, as shown in FIG. 6, to form a glass fiber mesh 34. Relatively thin cover sheets 36 and 38 of synthetic resin are closely adhered to respective outermost surfaces 40 and 42 of central body 24 of panel 22.

Figure 3:
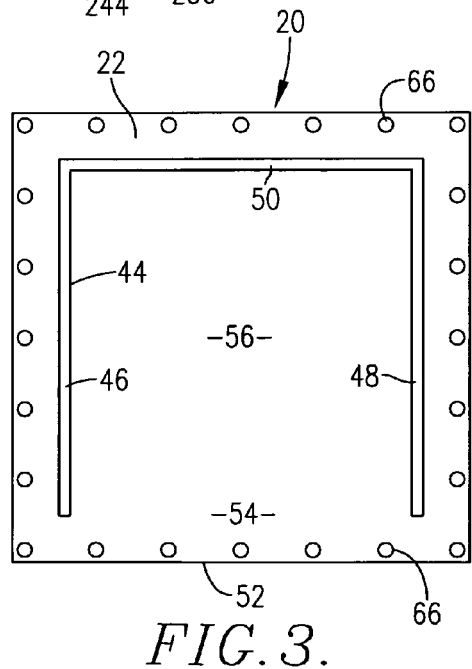
FIG. 3 is a plan view of another embodiment of the invention similar to the invention of FIG. 1, except that the groove defining the line of weakness is wider than the composite panel groove of FIG. 1.
Figure 4:
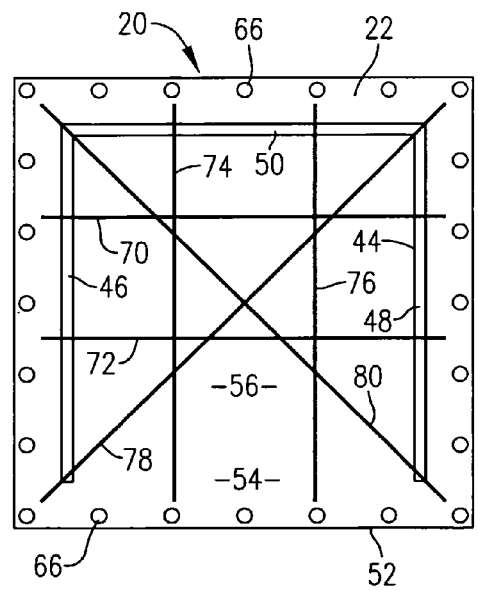
FIG. 4 is a plan view of an explosion vent having a main, central composite panel as shown in FIG. 3, and that is provided with reinforcing components similar to those of FIG. 2.
Figure 5:
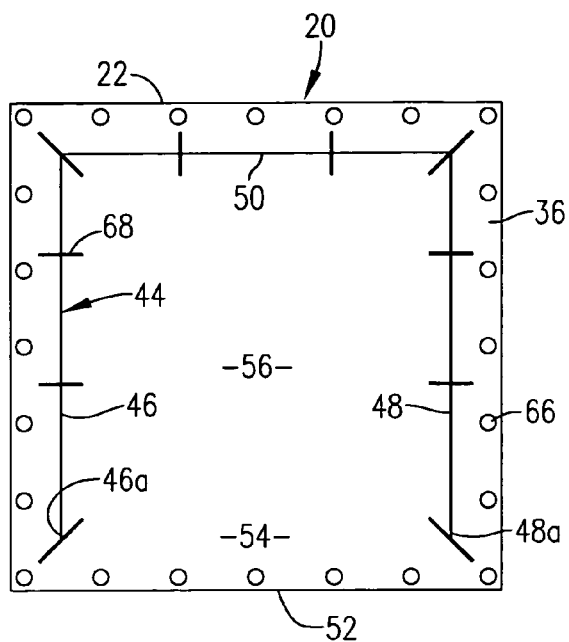
FIG. 5 is a plan view of an explosion vent as shown in FIGS. 1 and 2, except that a plurality of relatively short glass fiber reinforcing components are provided in overlying relationship to the line of weakness in the central main composite panel.

The central main composite panel 22 has a groove 44, as shown in FIGS. 3 and 9, that defines a line of weakness. Groove 44 preferably extends through the body 24 of panel 22 a transverse distance sufficient to interrupt most if not all of the reinforcing material 26, but not through the opposed cover sheets 36 and 38. In this embodiment of groove 44, the groove is of greater transverse width than depth, which, for example, may range in width from about 1.5 mm to about 30 mm. Cover sheets 36 and 38 preferably are each of overall sufficient dimensions to completely cover the central body 24 of composite panel 22, but should be at least of dimensions aligned with and extending beyond the groove 44. Although the glass fiber mesh 34 is not illustrated in FIG. 9 for clarity, it is apparent from that figure that the groove 44 interrupts the reinforcing material 26 comprising glass fiber mesh 34, throughout the length of groove 44. Groove 44, in plan view as depicted in FIGS. 1 and 5, preferably is of generally U-shaped overall configuration and therefore has a pair of spaced, parallel elongated leg sections 46 and 48 that are joined at adjacent extremities of leg sections 46 and 48 by a bight section 50. The end extremities 46a and 48a of leg sections 46 and 48 respectively, terminate equidistantly from the side margin 52 of panel 22 and define a hinge area 54 of panel 22 between end extremities 46a and 48a. The leg sections 46 and 48 and bight section 50 of groove 44 cooperate to present a central relief area 56 of panel 22.

It can be seen from the schematic, cross-section depiction of FIG. 9, that the groove 44 in composite panel 22 is of transversely rectangular configuration, and therefore has sidewalls 58 and 60 as well as an upper longitudinally extending elongated opening 61 and an opposed elongated opening 62. Groove 44 preferably, although not necessarily, contains a filler composition of 64. The filler composition 64 may fill all or part of the groove 44 and comprise a synthetic resin such as polypropylene or a suitable adhesive. It is desirable, but not essential, that the filler composition 64 firmly adhere to sidewalls 58 and 60 of central body 24, as well as to respective adjacent overlying surfaces of cover sheets 36 and 38.

Vent 20 is adapted to be mounted in a frame (not shown) of a relief opening in a structure to be protected from a high overpressure condition such as an explosion or products of combustion from a fast-burning fire. To that end, composite panel 22 and the cover sheets 36 and 38 are provided with a plurality of mounting openings 66 for receiving fasteners in the nature of bolts that firmly affix vent 20 to the support frame, and allowing ready replacement of vent 20 in the event of actuation by a high overpressure.

Groove 44 is formed in a composite panel blank, comprising either a single layer panel 22 having embedded reinforcing material 26, or a reinforced consolidated laminated panel 22, preferably using a high pressure water jet that is controlled such that the groove 44 extends entirely through panel 22, or through a sufficient thickness of the panel 22 to interrupt at least a portion, and preferably all, of the reinforcing material 26 therein. It is also preferred that the groove 44 interrupt reinforcement material 26 along the full length of the groove. Alternative methods of forming the groove 44 in panel 22 include a laser beam that vaporizes the resin and glass, or by mechanical abrasion using a grinding wheel or rotatable mill tool, or by using other equivalent material-removing or abrasion apparatus.

Panel 22 may be formed from a consolidated composite plate available from Vetrotex Renforcement S.A., Chambéry Cedex, France, as TWINTEX P PP 60 1485 1/1 AF. The code for the product is: "P" stands for a plate; "PP" means it is polypropylene matrix; "60" is the glass content in weight (%); "1485" is the nominal weight (g/m$^2$); "1/1" means it is a balanced product; and "AF" is a natural color roving type. This TWINTEX product is a pre-consolidated plate having woven co-mingled glass fibers and propylene yarns, and has a tensile strength (ISO 527) of about 300 MPa, a flexural strength (ISO 178) of about 280 MPa, an unnotched Charpy impact (ISO 179) of 160 KJ/m$^2$, and a notched Izod impact of (ISO 180) of 140 KJ/m$^2$. A typical plate for fabrication of vents may, for example, can be ordered, for example, as a 2000 mm×1200 mm variant.

These TWINTEX plates are commercially available from Saint-Gobain in selected thicknesses, overall width and height dimensions, with heat and UV stabilization, different types of glass fibers (roving of varying length strands, random length and oriented fibers, mesh, fabric, etc.), different ratios of weight of glass and types of synthetic resin, degrees of pre-consolidation as ordered by the customer, and natural or black color.

Covers 36 and 38 may, for example, be polypropylene sheets that are each 120 μm thick. Other polymers and sheet thicknesses can be chosen, for example, within the range of about 20 μm to about 1,000 μm as necessary to fulfill requirements of surface finishing and to control the base burst pressure of the vent. Composite panels 22 typically may range in thickness from about 1 mm to about 10 mm.

Vent 20 is preferably fabricated by placing a composite panel blank comprising, for example, a synthetic resin such as polypropylene having a glass fiber mesh 34 embedded therein and in which a groove 44 has been formed as previously described, in a suitable conventional heated platen press (not shown). Cover sheets 36 and 38 are placed over opposing surfaces 40 and 42 of central main composite body 24 before placement of the laminated assembly in the press, or in the alternative, the cover sheet 38, for example, may be placed in the press, the central body 24 having the glass fiber mesh 34 embedded therein then introduced into the press, and finally the cover sheet placed over the top of the central body 24. Heat and pressure may then be applied to the laminar assembly within the press.

If desired, a plurality of spaced elongated, relatively short reinforcing components 68 may be provided on the cover sheet 36 of panel 22 in overlying relationship to groove 44, as shown in FIG. 5, before closing of the platen press and application of heat to the laminar structure. Each of the components 68 preferably comprises glass fiber roving that is integrated with cover sheet 36 and body 24 during application of heat and pressure to the composite panel 22. Components 68 may be made up of continuous elongated glass fibers embedded in a synthetic resin such as polypropylene, or comprise glass fibers alone that are incorporated in the synthetic resin constituents of panel 22 as a result of melting of the synthetic resin of panel 22, including cover sheet 36 and a part of central body 24. The number of components 68 provided, the spacing between components 68, the strategic location of components 68 in overlying relationship to groove 44, and the transverse dimensions of components 68, including the nature and amount of the glass fibers, may be varied as desired to control the final overpressure required to effect rupture of the line of weakness.

Figure 2:
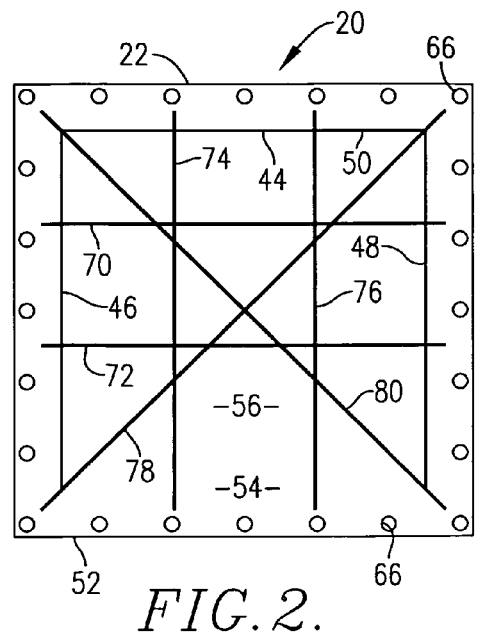
FIG. 2 is a plan view of another embodiment of the invention illustrating a non-metallic explosion vent similar to the vent of FIG. 1 except that two pairs of spaced elongated glass fiber reinforcing rovings are disposed in perpendicular relationship to one another on one surface of the vent in overlying relationship to respective sections of the groove in the composite panel, along with X-defining cross-element reinforcing rovings that intersect the other reinforcing rovings.

Viewing FIG. 2, it can be seen that in lieu of the relatively short reinforcing components 68 of the embodiment of panel 22 shown in FIG. 5, panel 22 may be provided with a pair of spaced, elongated, parallel glass fiber roving reinforcing components 70 and 72, that are integrated with panel 22 and extend substantially across the full width thereof. Likewise, a pair of spaced, elongated, parallel glass fiber roving reinforcing components 74 and 76 are integrated with panel 22 and extend substantially across the height dimension of the panel in perpendicular relationship to components 70 and 72. Additional reinforcement of panel 22 may be provided in the form of cross-reinforcement glass fiber roving components 78 and 80 that extend from respective opposite corners of panel 22, cross in the middle of the panel, and are at an angle with respect to components 70 and 72. Similar to reinforcing components 68, the transverse dimensions of components 70-80, including the nature and amount of the glass fibers, may be varied as desired to control the final overpressure required to effect rupture of the line of weakness. Components 68-80 may be located on top of cover sheet 36, as schematically shown in the drawings, or embedded in body 24 of panel 22 during compression of panel 22 in the heated press.

In fabrication of a preferred laminated panel 22, two of the glass fiber reinforced polypropylene Twintex plates, as identified above, are placed in a press. The plates may have a nominal thickness of about 2.65 mm. A press platen is lowered against the cover 36 overlying the upper surface of the top plate and the press temperature is ramped up at 10° C./min to a level above the 165° C. melting point of the polypropylene, preferably in the range of from about 165° C. to about 225° C. The pressure buildup preferably is at about 0.5 bar/min to an end pressure that may range from about 0.25 bar to about 3 bar. The nominal thickness of vent 20 comprising the composite panel 22, covers 36 and 38, and the reinforcing components 68, if provided, at full consolidation is preferably about 2.25 mm. The maximum pressure on the laminated panel is maintained for about 5 minutes at a maximum temperature within the press of about 200° C. While maintaining the pressure on the laminate panel 22, the press is allowed to cool at about 10° C./min to about 60° C., whereupon the panel 22 is removed from the press. The plates may be preheated, if desired, before being introduced into the press to impart a degree of rigidity to the laminated panel and facilitating introduction of the panel into the press between the upper and lower platens.

Components 70-80 serve to control the maximum burst pressure of the line of weakness defined by groove 44, and function to guarantee controlled opening of area 56. Furthermore, components 70-80 increase the stability of panel 22 and prevent fragmentation of central area 56 of panel 22 during opening of central area 56. Components 70-80 preferably are of continuous lengths of glass fibers that are combined with a synthetic resin such as polypropylene, or supplied without a resin constituent.

Figure 7:
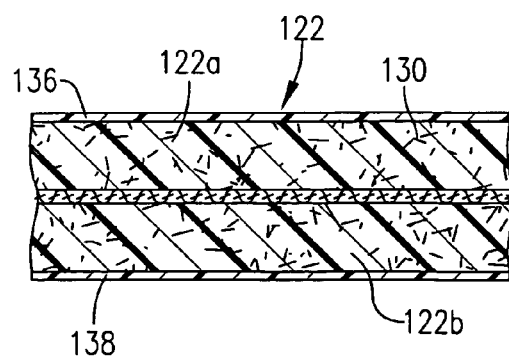
FIG. 7 is an enlarged, fragmentary, generally schematic cross-sectional representation of an alternate vent in accordance with this invention in which two composite panel members have been laminated under heat and pressure, with glass fiber fabric being provided in the central portion of the body of the main composite panel.

In addition to the selective provision of reinforcement components 68-80, the configuration and depth of groove 44 defining the line of weakness may be varied to further control the overpressure required to effect rupture of the line of weakness to open the central relief area 56 of the vent 20. The alternate constructions of composite panel 22, as schematically depicted in FIGS. 8-12, do not contain a showing of reinforcing material 26, for clarity of illustration. However, it is to be understood that each of these alternate embodiments is provided with reinforcement material 26, as shown in FIG. 6, or reinforcement material as depicted in FIG. 7, for example.

Figure 12:
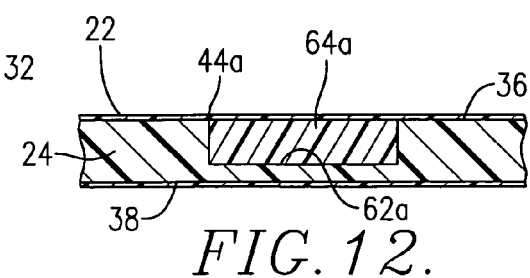
FIG. 12 is an enlarged, transverse cross-sectional view of the main composite panel illustrating another shape of groove in the panel.

The alternate line of weakness is illustrated in FIG. 12 has a U-shaped groove 44a that only partially extends through body 24 of panel 22. It can be seen from FIG. 12 that the bottom wall 62a of groove 44a is spaced from cover 38. However, the depth of groove 44a preferably should be sufficient to assure interruption of substantially all of the glass fiber material 26. Filler material 64a, preferably of polypropylene or the like, is provided in the groove 44a. Cover 36 overlies the entire upper surface of central body 24 of the composite panel 22, as well as material 64a filling groove 44a. The schematic showing of FIG. 12 is for illustrative purposes only, and it is to be understood that the depth of groove 44a is selectively controlled to obtain rupture of the line of weakness at a desired overpressure value. The groove 44a is of greater depth than width in the embodiment of FIG. 12.

Figure 8:
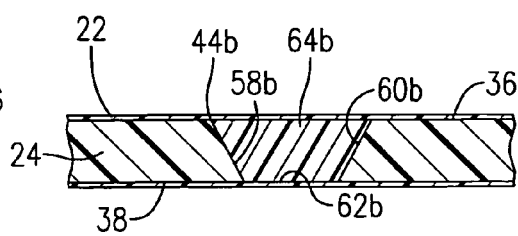
FIG. 8 is an enlarged, transverse cross-sectional view of the panel illustrating one shape of groove in the main composite panel.

In the alternate construction of panel 22 shown in FIG. 8, the groove 44b is of trapezoidal configuration and has opposed inclined sidewalls 58b and 60b which converge toward the bottom opening 62b of groove 44b that is covered by sheet 38. Groove 44b also preferably contains a filling 64b of polypropylene or similar resin, that is covered by sheet 36 overlying the upper surface of composite panel body 24.

Figure 10:
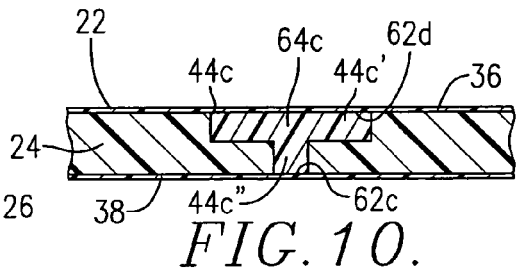
FIG. 10 is an enlarged, transverse cross-sectional view of the main composite panel illustrating another shape of groove in the panel.

Groove 44c of the alternate construction of panel 22 shown in FIG. 10 is of transverse T-shape. The upper leg portion 44c' of groove 44c is of greater width than the central bottom leg portion 44c". Cover sheet 38 overlies the bottom opening 62c of groove 44c while cover sheet 36 overlies the upper opening 62d of groove 44c. Groove 44c also preferably has a filling 64c of a synthetic resin, such as polypropylene.

Figure 11:
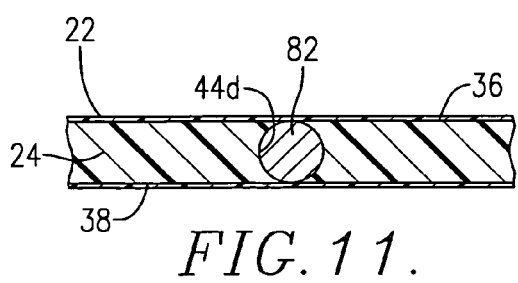
FIG. 11 is an enlarged, transverse cross-sectional view of the main composite panel illustrating another shape of groove in the panel, with an elongated metal bar being provided in the groove.

Groove 44d in composite panel 22, as schematically depicted in FIG. 11, is of circular cross-sectional configuration. A rod 82, preferably of steel, is positioned in groove 44d. Rod 82 is of a cross-sectional diameter complemental with the circular walls of groove 44d. Although rod 82 as schematically shown in FIG. 11 is essentially of the same diameter as groove 44d, rod 82 may be of lesser diameter than the groove, with the space surrounding rod 82 within groove 44d containing a filler of synthetic resin. In a preferred embodiment of panel 22, the overall U-shaped bent steel rod 82 has a diameter of 2 mm and is provided with a release coating to improve non-adhesion of the surrounding polypropylene resin to the steel rod. It is to be noted that reinforcement components 68-80 are in bridging relationship to rod 82. Preferably, groove 44d is formed in composite panel 22, rod 82 is inserted in the groove, along with synthetic resin filler if desired, whereupon cover sheets 36 and 38 are applied to opposite surfaces of panel 22, and the assembly is then placed in the heated mold.

The provision of a steel rod in groove 44d serves to maintain the integrity and uniformity of groove 44 throughout its length during formation of panel 22 in the heated press. In addition, rod 82 contributes to control of the burst pressure of panel 22 by rupturing of the line of weakness defined by groove 44 and assures that the line of weakness ruptures uniformly along its entire length. Although a steel rod 82 is preferred, the rod may be of other materials including a thermoset resin, or thermoplastic resin having properties adding rigidity to the rod greater than that of the central body 24 of panel 22.

Groove 44e, shown schematically in FIGS. 1 and 2 of the drawings, is depicted as being substantially narrower than groove 44 in panel 22 of FIGS. 3 and 9. It is to be understood in this respect that the effective width of a groove defining the line of weakness in panel 22 and that outlines three sides of the central relief area 56 is variable to obtain a selected burst pressure for vent 20. Although grooves 44 and 44a-e are shown as defining a rectangle, it is to be understood that the groove may be of different configurations including semi-circular, or rectangular with curved portions at the corners of a generally rectangular shape.

Although reinforcement material 26 is preferably a glass fiber composition, other materials may be used having a greater tensile strength than the resin of panel 22. For example, a stainless steel mesh may be embedded in panel 22, so long as the stainless steel mesh is interrupted throughout the length of the groove in the panel. Alternatively, reinforcement material 26 may be thermoplastic resin coated aramide fibers or mesh. Aramid fibers may also be used for the reinforcing components 68-80.

The alternate laminar panel 122 construction of this invention illustrated in FIG. 7, preferably is fabricated by introducing two synthetic resin plates 122a and 122b into the heat press, each of which contains relatively short, randomly distributed glass fibers 130. Fiberglass fabric 132 is interposed between plates 122a and 122b. Cover sheets 136 and 138 are positioned over the outermost faces of plates 122a and 122b respectively. Although not shown in FIG. 7, it is to be understood that panel 122 are provided with a groove of a transverse configuration such as grooves 44, 44a-e.

Figure 13:
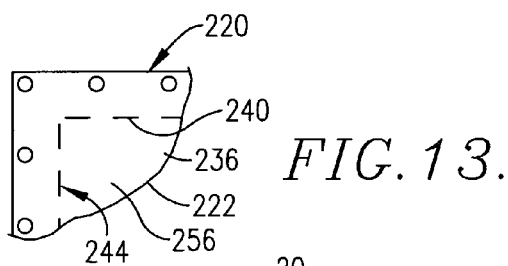
FIG. 13 is a fragmentary plan view of an alternate embodiment of the panel shown in FIG. 1, having a series of spaced slits in the main composite panel that cooperate to define a line of weakness.

The composite panel 222 of alternate vent 220 shown in FIG. 13 is provided with a series of notches 240 that cooperate to define a line of weakness 244 of overall U-shaped configuration, similar to groove 44. It is to be understood in this respect that the cover 236, of essentially the same material and of the same thickness as cover 36, overlies the upper surface of composite panel 222, and over the notches 240 defining groove 244. The overpressure condition causing the central section 256 of vent 220 to open is controlled in part by the length of the individual notches 240, the distance between terminal ends of adjacent notches 240, and the depth and shape of notches 240.

Because vent 20 is preferably fabricated using a composite panel 22 of synthetic resin material having glass fiber reinforcement material embedded therein, vent 20 is not adversely affected by exposure to sunlight and is able to withstand varying atmospheric conditions. The vent 22 does not accumulate static electric charges, is not combustible or self-combustible at short exposure, and contains only non-irritating, non-toxic materials.

By varying the composition of composite panel 22, the thickness of panel 22, using different thermoplastic resins for panel 22 and cover sheets 36 and 38, as well as the depth and shape of groove 44, or notches 240 defining line of weakness 244, and the type of reinforcement material 26, a wide range of burst pressures for vent 20 may be afforded. Furthermore, selection of the type of material and the thickness of sheets 36 and 38 can provide some degree of selective contribution to control of the burst or failure pressure of the vent. Similarly, by changing the weight of the fiber yarn of material 26 and of the components 68-80, further control of the failure pressure can be obtained. Likewise, components 68-80 may be placed in bridging relationship across the top of grooves 44 and 44*a-e*, or on cover sheet 38 beneath the grooves. Alternately, components 68-80 may be embedded in panel 22 on the top or bottom of material 26 as shown in FIG. 6, or on top of or below the fabric 132 of panel 122. A thermoplastic material such as polypropylene is preferred as the resin portion of panels 22 and 122 because it has a higher ductility than a thermoset resin, thereby reducing the likelihood of fragmentation of the vent at hinge area 54. Another option is the use of thermoplastic powder impregnated glass yarn, coated with thermoplastic resin. The provision of optional reinforcement components 68-80 in bridging relationship to grooves 44, 44*a-e*, serves to provide a momentary time delay in the opening of the vent, as a result of peeling of the reinforcement components away from the surface of the panel, thereby diverting peak energy away from hinge area 54, thus preventing separation of relief area 56 from the perimeter portion of panel 22 or fragmentation of that area.

Composite panel 22 is particularly useful for fabrication of relatively large vents, for example, from about 200 mm by 200 mm to about 1500 mm by 2000 mm. The overpressure value at which central relief area 56 opens can be decreased as the overall size of the vent is increased because the vent area increases at a faster rate than the increase in length of grooves 44, 44*a-e*.

The use of a thermoplastic composite material for fabrication of vent 20 allows the shape of the vent to be varied by simply changing the shape of the press molds. For example, the central area of the composite panel 22 can be formed into a dome that is either symmetrical, asymmetrical, or of a pyramidal shape, depending upon the burst characteristics specified for a particular application of the vent. Techniques for fabricating vent 20 can also be varied, including preheating of the panels followed by cold pressing in a press, or between a double belt laminator.

Because vent 20 is constructed of synthetic resin material having reinforcing material embedded therein such as glass fibers, mesh, or fabric, the completed vent lends itself to a variety of sanitary applications. Composite panel 22 may be routinely and periodically subjected to conventional sanitizing procedures without alteration of the burst characteristics of vent 20.

We claim:

1. A non-metallic explosion vent for protecting a confined space from a high overpressure condition comprising:
   a composite panel of a synthetic resin, said resin being reinforced with material having greater tensile strength than the resin,
   said panel having a pair of opposed surfaces and provided with an elongated groove therein that extends transversely inwardly from one of the surfaces of the panel through at least a portion of the thickness of the panel,
   said groove interrupting the reinforcing material to define a line of weakness that presents a relief area of the panel that opens under said overpressure condition, said groove being filled with a filler composition.

2. An explosion vent as set forth in claim 1, wherein said panel is of generally flat configuration.

3. An explosion vent as set forth in claim 1, wherein said groove is of generally U-shaped overall configuration having opposed elongated leg sections and a bight section therebetween, the segment of the panel between the leg sections of the groove remote from said bight section defining a hinge portion of the panel for the relief area.

4. An explosion vent as set forth in claim 3, wherein said groove is uninterrupted throughout its length.

5. An explosion vent as set forth in claim 1, wherein the groove is of generally U-shaped configuration transversely thereof.

6. An explosion vent as set forth in claim 1, wherein said groove is of greater width than depth.

7. An explosion vent as set forth in claim 1, wherein said material reinforcing the synthetic resin of the panel comprises glass fibers.

8. An explosion vent as set forth in claim 7, wherein said glass fibers comprise elongated strands of glass roving.

9. An explosion vent as set forth in claim 7, wherein said glass fibers comprise strands of glass oriented to present a woven mesh.

10. An explosion vent as set forth in claim 1, wherein said panel is provided with a central body, there being synthetic resin sheets overlying the body and defining said opposed surfaces of the panel.

11. An explosion vent as set forth in claim 10, wherein each of said sheets is substantially thinner than the thickness of the central body of the panel.

12. An explosion vent as set forth in claim 10, wherein said groove extends only through one of the sheets and through the entire thickness of the central body of the panel.

13. An explosion vent as set forth in claim 1, wherein said line groove is of generally trapezoidal configuration transversely thereof.

14. An explosion vent as set forth in claim 1, wherein said groove is of generally T-shaped configuration transversely thereof.

15. An explosion vent as set forth in claim 1, wherein said groove is of generally circular configuration transversely thereof.

16. An explosion vent as set forth in claim 15, wherein an elongated steel bar is provided within said groove.

17. An explosion vent as set forth in claim 1, wherein is provided a plurality of spaced, elongated reinforcing components embedded in the panel, each of the components being in overlying relationship to the groove.

18. An explosion vent as set forth in claim 1, wherein said panel is of generally rectangular configuration having side margins, said groove being of overall generally U-shaped configuration having a pair of generally parallel leg sections and a bight section between adjacent end extremities of the leg sections, said leg sections and the bight section of the groove being generally parallel to and in adjacent relationship to respective side margins of the panel.

19. An explosion vent as set forth in claim 18, wherein said leg sections and the bight section of the groove are each of generally rectilinear configuration.

20. An explosion vent as set forth in claim 1, wherein said relief area of the panel opens at a pressure of from about 25 mbar to about 200 mbar.

21. An explosion vent as set forth in claim 1, wherein said panel is a pre-consolidated plate, the synthetic resin is polypropylene, and said material is glass fibers incorporated in the polypropylene.

22. An explosion vent as set forth in claim 1, wherein said material is glass fibers comprising about 60% by weight of the panel.

23. An explosion vent as set forth in claim 1, wherein said panel has a tensile strength modulus of about 300 Mpa.

24. An explosion vent as set forth in claim 1, wherein said panel has a flexural strength modulus of about 280 Mpa.

25. An explosion vent as set forth in claim 1, wherein said synthetic resin is a thermoplastic resin and the material is glass fibers.

26. An explosion vent as set forth in claim 1, wherein the transverse width of the groove is from about 1.5 mm to about 30 mm.

27. A non-metallic explosion vent for protecting a confined space from a high overpressure condition comprising:
 a composite panel of a synthetic resin, said resin being reinforced with material having greater tensile strength than the resin,
 said panel having a pair of opposed surfaces and provided with an elongated groove therein that extends transversely inwardly from one of the surfaces of the panel through only a portion of the thickness of the panel; and
 a plurality of spaced, elongated reinforcing components carried by the panel, each of the components overlying the groove,
 said groove interrupting the reinforcing material to define a line of weakness that presents a relief area of the panel that opens under said overpressure condition, said groove being filled with a filler composition.

28. An explosion vent as set forth in claim 27, wherein said reinforcing components are unitary with the panel.

29. An explosion vent as set forth in claim 27, wherein each of said reinforcing components comprises glass fiber roving.

30. An explosion vent as set forth in claim 27, wherein at least two of said reinforcing components overlie the groove and extend substantially across the full width of the relief area of the panel, said at least two reinforcing components intersecting each other near the middle of the relief area of the panel.

31. An explosion vent as set forth in claim 27, wherein is provided at least two reinforcing components, said components overlying the groove and being positioned in generally perpendicular and intersecting relationship to one another across the relief area of the panel.

32. An explosion vent as set forth in claim 31, wherein the reinforcing components include a cross-element that extends across said relief area of the panel at an angle to said two components.

33. An explosion vent as set forth in claim 32, wherein is provided a pair of said cross-elements, said cross-elements being at an angle with respect to one another.

34. An explosion vent as set forth in claim 27, wherein said panel comprises two unitary synthetic resin layers, each of said layers being provided with reinforcement material having a greater tensile strength than the synthetic resin of the each layer, said groove extending entirely through one layer and only a portion of the other layer.

35. An explosion vent as set forth in claim 34, wherein said reinforcing material is located between said layers.

36. An explosion vent as set forth in claim 35, wherein said reinforcing material comprises woven glass fabric.

37. An explosion vent as set forth in claim 36, wherein said material includes random glass fibers on each side of the fabric.

38. An explosion vent as set forth in claim 27, wherein is provided a number of elongated reinforcing components embedded in one of the layers and each overlying the groove.

39. An explosion vent as set forth in claim 38, wherein said reinforcing components comprise glass fibers.

40. An explosion vent as set forth in claim 27 wherein is provided unitary synthetic resin cover sheets on opposite sides of the panel.

41. An explosion vent as set forth in claim 40, wherein the thickness of the panel is about 2.25 mm and the thickness of each of the sheets is about 120 μm.

42. An explosion vent as set forth in claim 27, wherein said filler composition is a synthetic resin.

43. An explosion vent as set forth in claim 27, wherein the thickness of said panel is about 2.25 mm.

44. An explosion vent as set forth in claim 43, wherein the groove is of generally circular configuration, the diameter of the groove being about 2 mm, and a steel bar having a diameter of about 2 mm being provided in the groove.

* * * * *